United States Patent [19]

Zenzefilis

[11] 4,175,270
[45] Nov. 20, 1979

[54] METHOD AND APPARATUS FOR RECORDING AND REPRODUCING VIDEO

[76] Inventor: George E. Zenzefilis, 27 Los Vientos, Camarillo, Calif. 93010

[21] Appl. No.: 859,742

[22] Filed: Dec. 12, 1977

Related U.S. Application Data

[60] Division of Ser. No. 511,932, Oct. 3, 1974, which is a continuation-in-part of Ser. No. 289,989, Sep. 18, 1972, abandoned, which is a division of Ser. No. 23,289, Mar. 27, 1970, Pat. No. 3,701,846.

[51] Int. Cl.² .................. H04N 5/76; H04N 5/84; H04N 9/02; G11B 5/09; G11B 5/012; G11B 5/82

[52] U.S. Cl. .................................. 358/128; 358/4; 358/7; 358/130; 360/32; 360/33; 360/19; 360/37; 360/97; 360/135

[58] Field of Search ................ 358/4, 128, 130, 132, 358/6, 7; 360/10, 33, 77, 75, 97, 122, 11, 32, 19, 37, 135

[56] References Cited

U.S. PATENT DOCUMENTS

| | | | |
|---|---|---|---|
| 3,371,154 | 2/1968 | Frohbach et al. | 358/128 |
| 3,509,274 | 4/1970 | Kihara | 360/10 |

FOREIGN PATENT DOCUMENTS

714365  8/1954  United Kingdom .................. 358/128

Primary Examiner—John C. Martin
Attorney, Agent, or Firm—Henry M. Bissell

[57] ABSTRACT

The video or television signals are broken into numerous elements representing spaced portions of the video display screen along the line sweep, and imprints (electrical or optical) for each element are made in a path on a rotating medium which may be a disc, drum or belt. The lineal length of each imprint on the path is determined by the light characteristic of the video signal being recorded. Clock marks are permanently recorded in a separate path on the rotating medium.

Maximum density of imprints is achieved by using an extremely narrow width of about one ten thousandth to one thousandth of an inch wide, and not only make adjacent tracks contiguous, but actually overlapping.

Sound is supplied by using an unused portion of the video signal and the trailing edges of the line start pulses are convenient portions. Because the tracks may overlap or small errors in concentricity may occur that would otherwise meld together sound from two side-by-side tracks, only certain digitally spaced parts of one track are used for sound and different digitally spaced portions of another track are used. The method and apparatus permits transcribing broadcast television signals or transcribing directly from a television set and permits playback directly into a set, or if modulated by very high or ultra high frequency waves, may be broadcast as conventional television, or introduced directly into a broadcast television receiver by attachment to the antenna terminals.

18 Claims, 27 Drawing Figures

FIG. 3
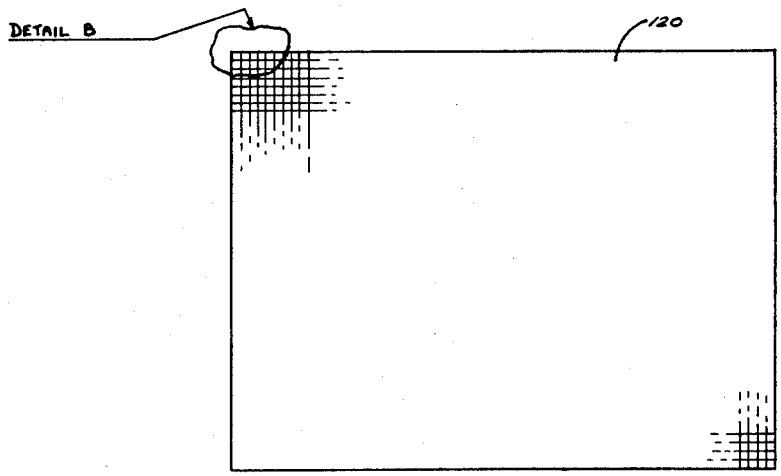
FIG. 4
FIG. 5
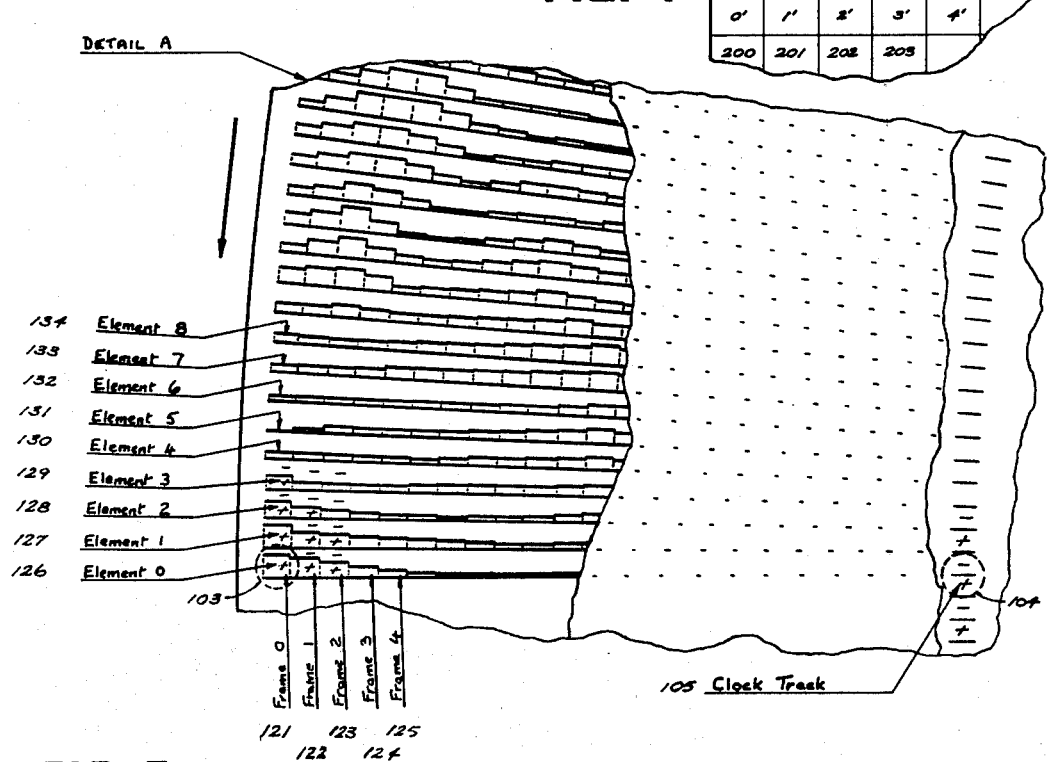

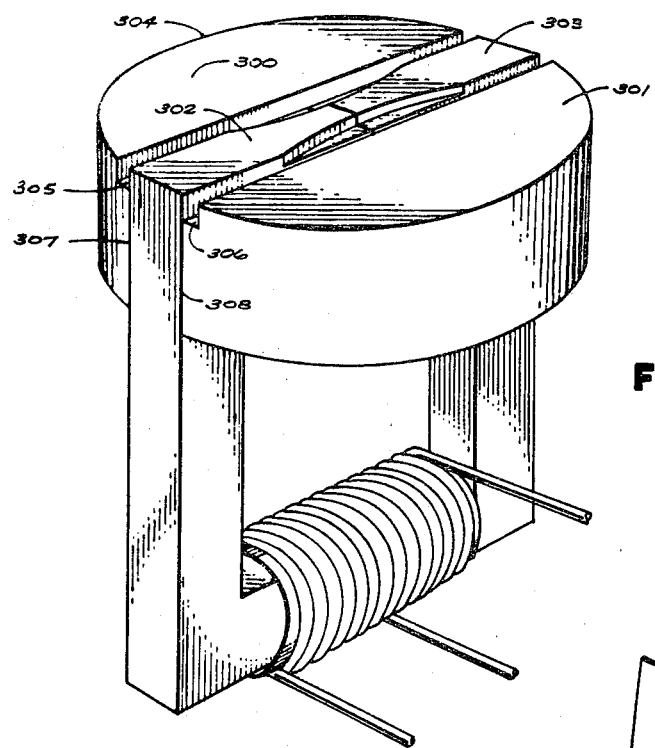
FIG. 20
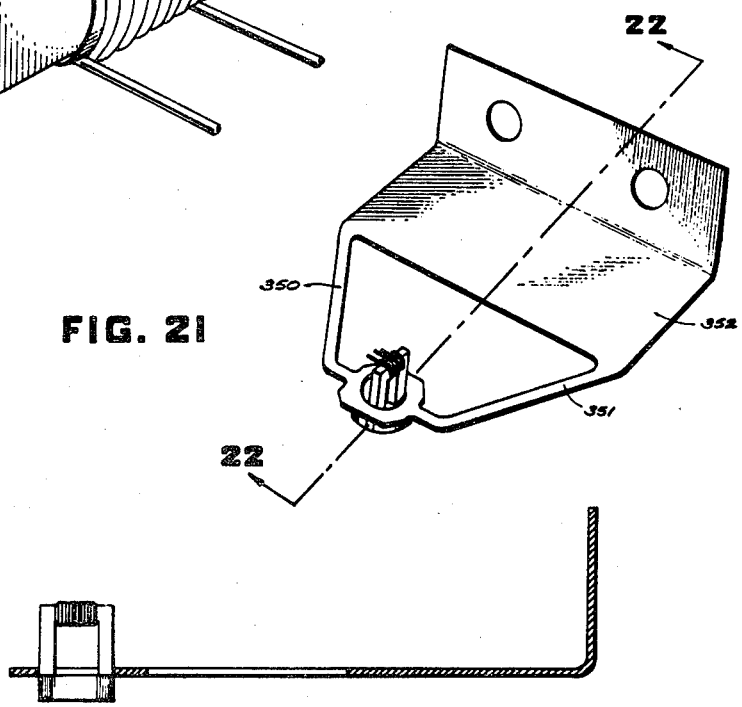
FIG. 21
FIG. 22

METHOD AND APPARATUS FOR RECORDING AND REPRODUCING VIDEO

RELATED APPLICATION

This application is a division of application Ser. No. 511,932 which filed Oct. 3, 1974 is a continuation-in-part of copending application Ser. No. 289,989, filed Sept. 18, 1972, and now abandoned, which itself is a division of application Ser. No. 23,289, filed Mar. 27, 1970, now U.S. Pat. No. 3,701,846.

I have invented a new system of recording and reproducting television signals on either magnetic or photographic discs (or cylindrical surfaces in general, including belts) which is simple, permits the incorporation of color and sound, is compatible with the present day television standards, is cheap to manufacture and which also permits maximum storage economy of the recording medium because the redundancies commonly existing in standard television signals or in motion picture films are greatly reduced.

(a) Basically, in the preferred embodiment of this invention, the system consists of a disc approximately 14 inch in diameter and a moving service transducer which records or reads out the information. The disc rotates at a uniform angular velocity and the transducer moves radially either in discrete and minute steps or at a certain small velocity more or less uniform, thus the recording consists of tracks essentially circular. However, these tracks are on purpose contiguous and in fact they may overlap each other by a certain percentage. The information to be recorded is conveyed to the recording part of the system by means of a single line and in the standard video form in which the field and scanning synchronization signals are intermeshed with the picture signals. Every television frame (which consists of two interlaced fields of lines of scan) is analyzed immediately prior to recording uniformly into a number of small picture elements each having a predetermined and fixed screen location, arrayed in the sequence of scanning. This is accomplished by sampling the amplitude of the input video signal at equally spaced intervals. Thus each of these measured values will be considered to be the measure of brightness of a picture element, and the interval between two successive samples will be considered to be the length of each element. Each television frame is recorded during one revolution of the disc and since the disc rotates at a speed corresponding to one revolution per frame, each recorded frame occupies one complete track without any circumferential gaps or overlaps. Additionally, a certain provision is taken to order the recorded position of these elements in such a way that each will be placed at a specified angular position along their track. The code chosen is the type known as PLC (Pulse Length Coding), in which the position of each picture element is recorded by one type of indication, saturated magnetization in one or the other current direction in the recording transducer in the case of magnetic discs and full exposure or not in the case of photographic discs, and its measure corresponding to the amplitude of the original video signal, by the angular width of the storage element. Now, since there is a statistical time interdependence between the picture elements of two succeeding frames their element width will tend to be almost identical. Thus, even though the recording is performed circumferentially the recorded signals form a pattern radial in nature. The philosophy of using this arrangement is that during playback the reading transducer is not required to follow precisely the tracks, as it is required in most systems that already exist or have been proposed, simply the reading transducer progresses radially at a certain velocity while intercepting a radial array of variations due to the signals recoreded in the various tracks. However, it should be pointed out that for purposes of interchangeability in which these discs are recorded and played back in different machines elsewhere, they must be rotated on turntables in such a way that the center of rotation during playback is the same as the center of rotation during recording. Otherwise any introduced eccentricity will cause the transducer to wander periodically over portions of tracks other than the proper one, thus causing a picture distortion as follows: the stationary in time picture elements will appear correctly and the changing in time elements may appear as occupying earlier or later positions. Therefore in this invention I substitute for the task of providing a servo-mechanism to position the reading transducer on the required track, the task of maintaining accurate center of rotation.

(b) The sound is in the form of signals placed at some unused portions of the picture signal such as the trailing edge of the synchronizing signals. However, because a certain degree of unavoidable eccentricity is expected during playback resulting in the transducer wandering through several tracks, and also because of the fact that the tracks themselves overlap, the sound is encoded on every fourth horizontal synchronizing signal (or on any other number according to specific needs), which ordering in the United States television standard of 525 lines per frame results in an automatic precession by one, that is, the sound encoded synchronizing signals in successive tracks from arrays of 131 such signals displaced each time by an angular interval of 360/525 degrees. During playback the reading transducer detects the sound contained correspondingly in every fourth synchronizing signal, ignoring the intervening three.

(c) A dominant feature of this invention is the fact that any television receiver in the United States can display both picture and sound information as reproduced by the disc recording system being described, without any modification. Another feature is the ability to incorporate color because of the general compatibility standards of the United States system, in which neither the bandwidth nor the coding method for color differs from those for black and white. A further feature of my invention provides for the recording and playback of color video by means of a system of modulation which permits the recording of color with reduced bandwidth.

(d) Because of the fundamental simplicity of this system, namely one disc rotating directly by a synchronous type motor and a single service transducer moving radially by means of a simple drive such as a helical screw, the system is indeed surprisingly inexpensive to manufacture. The reproduction of the discs for broad consumer dissemination is also very simple, in the case of photographic discs: because of the small dimensions involved they can be replicated by a contact exposure process unlike the usual reproduction methods of photographic motion picture films which require serial exposure. A salient feature of this system is a novel means of achieving easy disc interchangeability by the usage of an insert ring. This is simply attached permanently in the disc center and provides two points only of contact with the rotating motor spindle, and thus ensures that the disc rotates with the same center in all machines.

(e) Another dominant feature of this invention is the fact that a good proportion of the usual redundancies existing in common television signals and also in motion picture films can be reduced. This is so because both television systems and motion picture films contain a much larger number of frames or images per second than the human eye can reasonably follow. The large rate of these frames has been used mainly in order to avoid the sensation of discontinuity. The eye can detect variations of light intensity occupying large areas as flicker if they occur slower than about forty or fifty per second. Since with the described scheme the discs reproduce always the frames, and hence the fields, at the standard rate (in the United States 30 frames or 60 fields per second) flicker is undetectable regardless of the radial velocity of the transducer. By correctly adjusting the radial progress of the latter the present scheme achieves a significant compression of the needless time detail and hence a considerable improvement in the storage capacity of the disc without appreciable loss of spatial detail. More specifically, an otherwise stationary scene which contains a certain moving object, say a rapidly running horse, if transmitted and received faithfully by the standard television system, would be perceived by an observer as a stationary scene containing a blur. The same scene recorded with the herein described time detail compression will also appear as a stationary scene containing a blur somewhat more exaggerated. And this because the overlapped tracks will still contain the time-unvarying frame elements in full integrity because the overlapping has not changed either the distribution of these or their measure since the latter is in the form of PLC, while the time-varying elements will be distorted. Thus, for example, during the action of recording the transducer may be arranged to move radially more rapidly during scenes that contain rapidity of movement creating tracks which are only slightly overlapped, and more slowly for scenes which change slowly and thus overlapping the tracks more heavily. Of course, during the playback the transducer will also be moving more rapidly or more slowly in correspondence, by means of control information incorporated in other unused portions of the signal.

Various objects, advantages and features of the invention will be apparent in the following description and claims considered together with the accompanying drawings forming an integral part of this disclosure and in which:

FIG. 3 is a diagram of a television screen marked into horizontal lines and each line is divided into elements.

FIG. 4 is an enlarged portion of detail B of FIG. 3 showing the nomenclature used for marking the different elements.

Figure 5A:
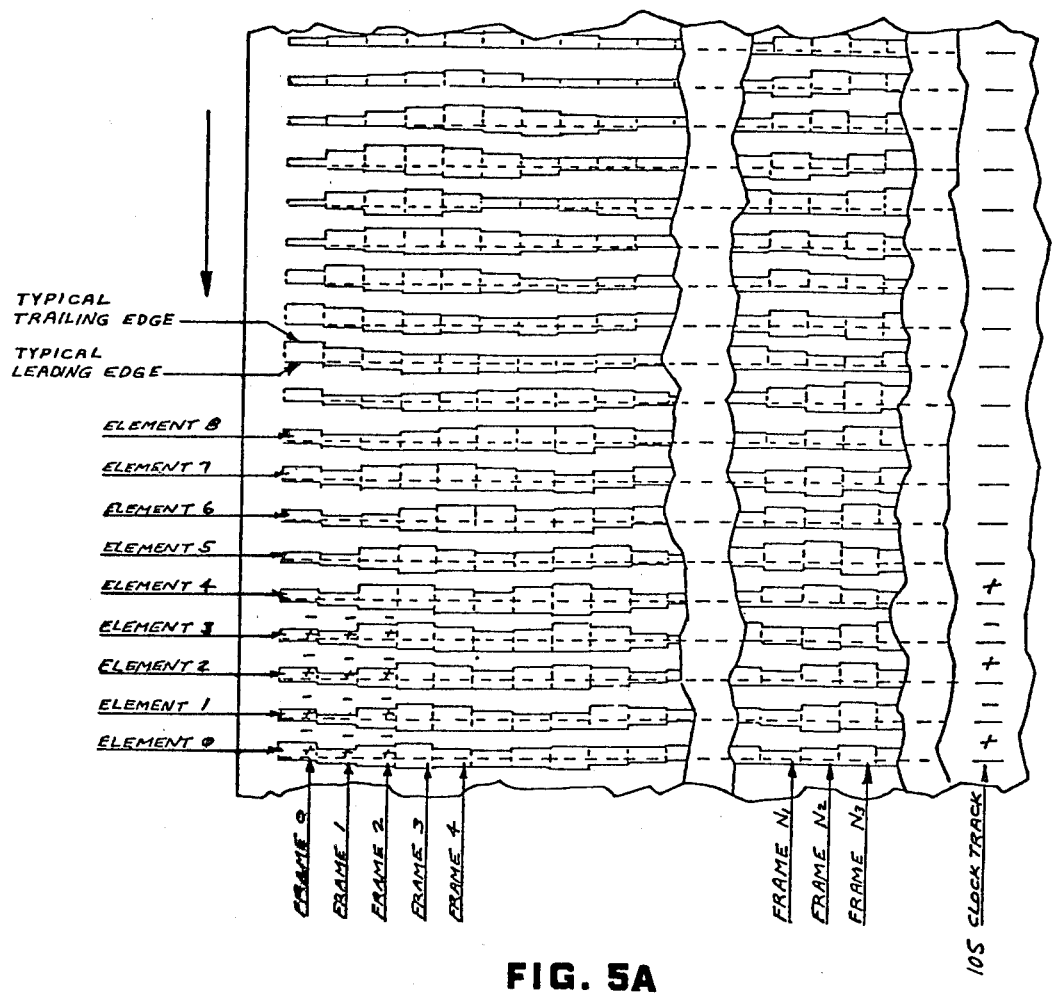
FIG. 5 is an enlarged diagram of a portion of a rotating disc similar to that of FIG. 1 wherein the magnetic recordings of succeeding frames are touching each other or continuous.

FIG. 5A is a diagram similar to FIG. 5 showing the recorded imprints either near the periphery of a disc viewed under strong magnification or the left-hand edge of a developed cylindrical surface, or even the left-hand edge of a belt (say a strip or tape). Here the leading boundary of each imprint carries information as well (for instance chrominance information in the case of recordings in color).

Figure 6:
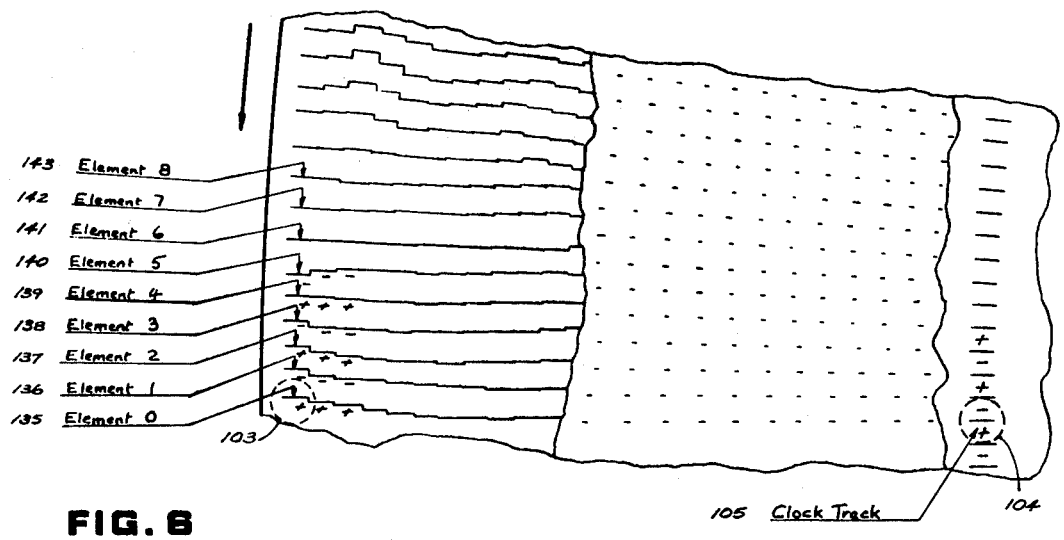

FIG. 6 is a diagram similar to FIG. 5, but with the beginning portion of each imprint removed because this information is supplied by the clock track also shown in that figure.

Figure 7:
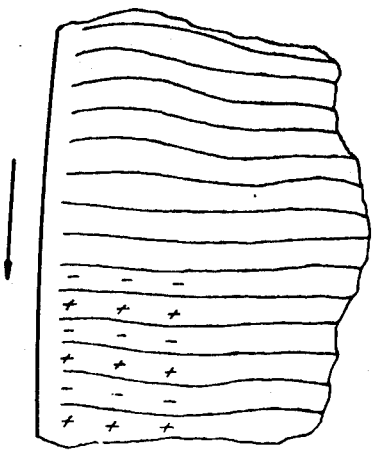

FIG. 7 is a diagram similar to FIG. 6 showing how the marks of the ends of each element imprint when overlapped with adjacent tracks forms a continuous curve rather than the rectangular steps as in FIG. 6, and this occurs when the tracks are narrow and if the radial progression of the transducer is slow.

Figure 1:
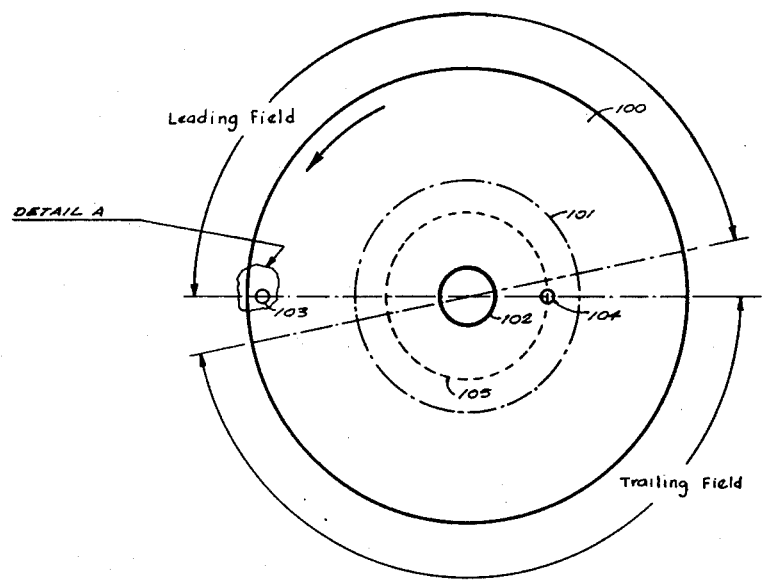
FIG. 1 is a diagram of a rotatable magnetic disc embodying the invention.
Figure 8:
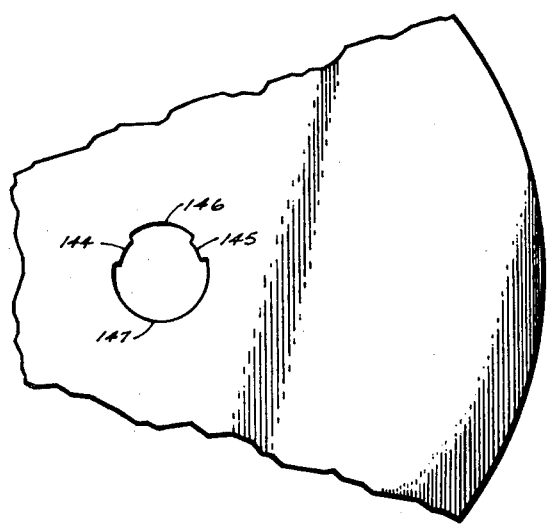

FIG. 8 is a plan view of a segment of a disc similar to that of FIG. 1, but wherein the circular spindle hole is relieved except at two portions which make contact with a spindle.

Figure 9:
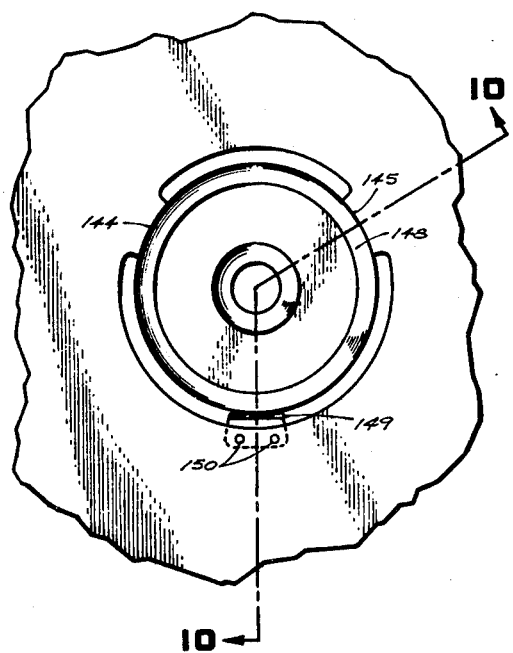

FIG. 9 is an enlarged view of the spindle hole of FIG. 8, but with the addition of a spring clip which holds the projecting portions in contact with a spindle also shown in FIG. 9.

Figure 10:
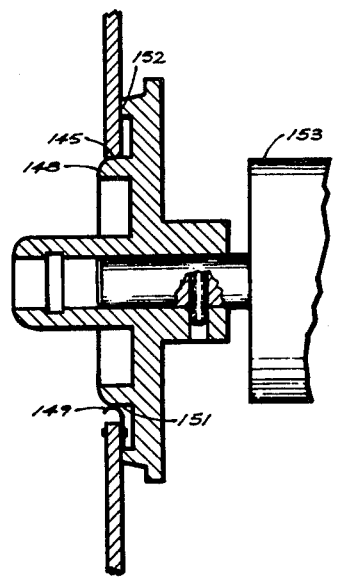

FIG. 10 is a sectional view along the line 10—10 of FIG. 9 showing the contact with the spindle and the action of the spring.

Figure 11:
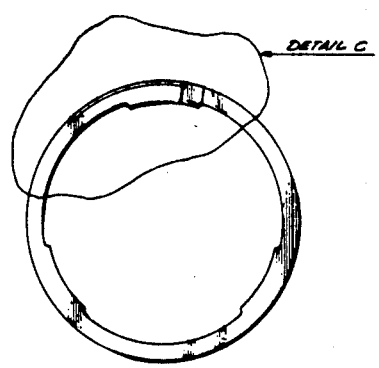

FIG. 11 is a plan view of a modified form of structure to effect the function of the structure of FIGS. 8 through 10, wherein an insert hub is used for a disc and the spring is integrally formed by machining from a ring.

Figure 12:
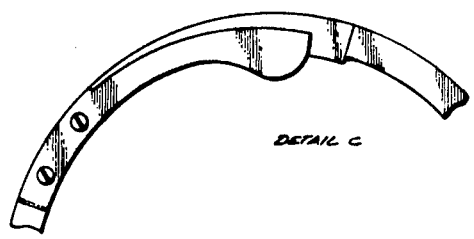

FIG. 12 is a modified form of the structure of FIG. 11 wherein a separately fastened on spring member is attached to the hub.

Figure 13:

FIG. 13 is an elevation view of the hub of FIG. 11 with a thin disc attached thereto, such as a photographic disc for the recording and playback according to the invention.

Figure 14:
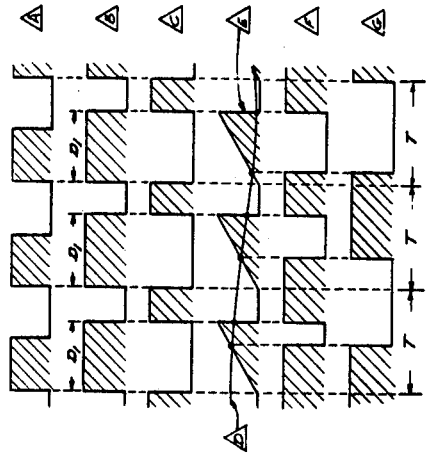
Figure 15:
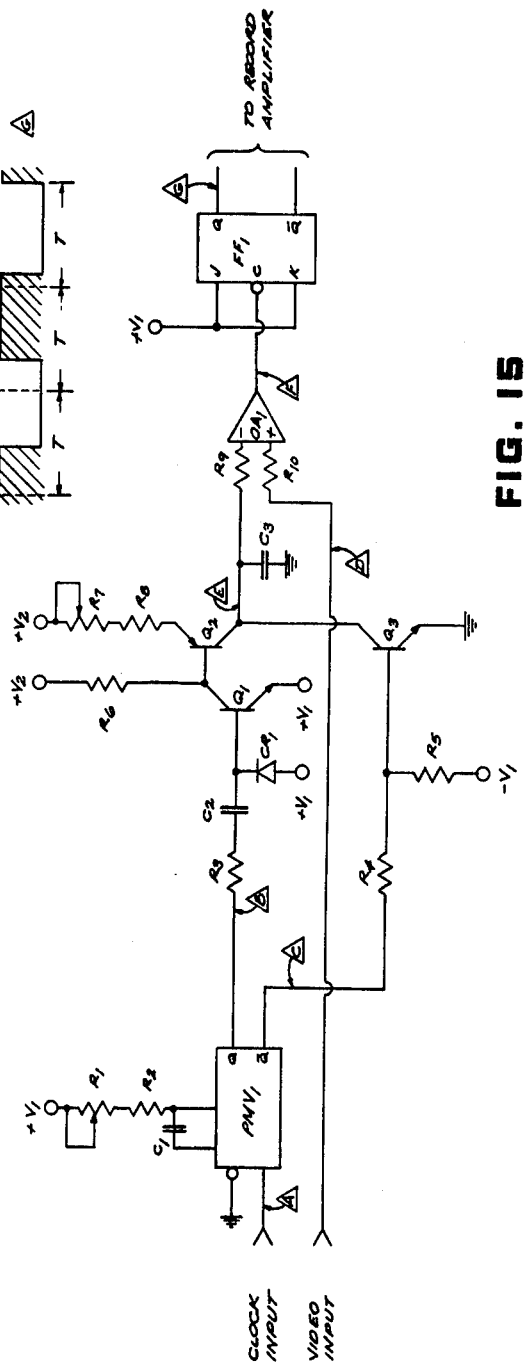

FIG. 14 is a diagram of wave forms existing at different portions of the circuit of FIG. 15 wherein the wave forms are identified by a letter inside of a triangle on both figures.

FIG. 15 is a preferred form of encoder which analyzes the video signals into the picture elements and encodes it in the pulse length coding illustrated in prior figures.

Figure 16:
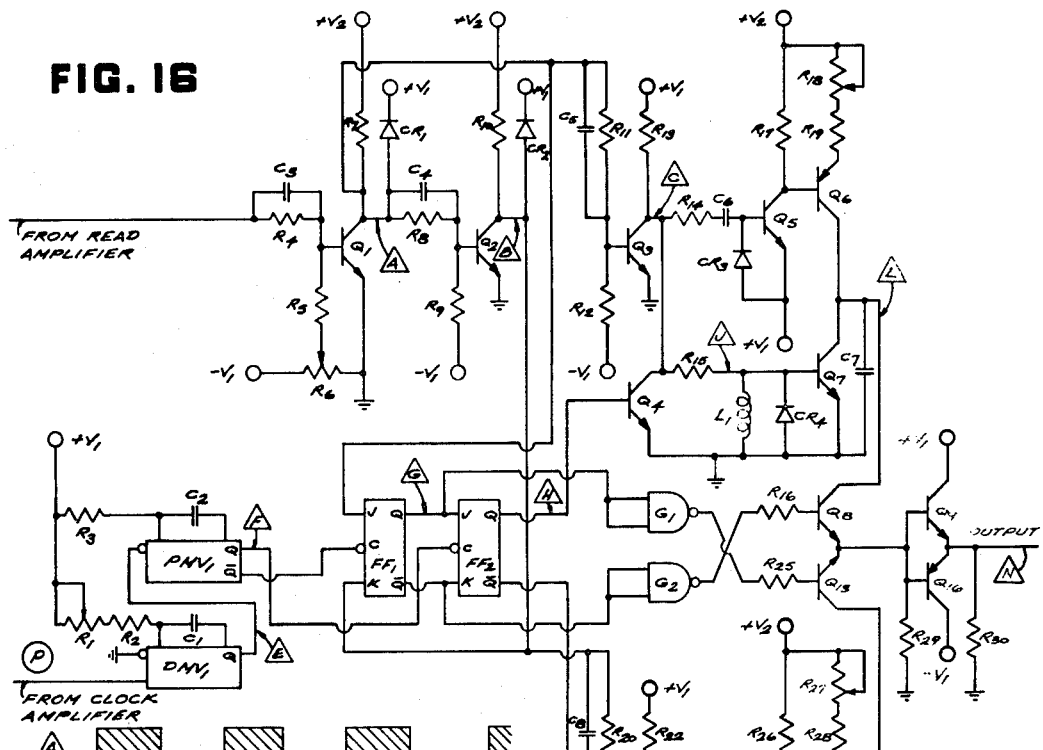

FIG. 16 is a schematic diagram of a preferred form of decoder circuit which takes information from an amplifier and converts in into usable television or video pictures.

Figure 17:
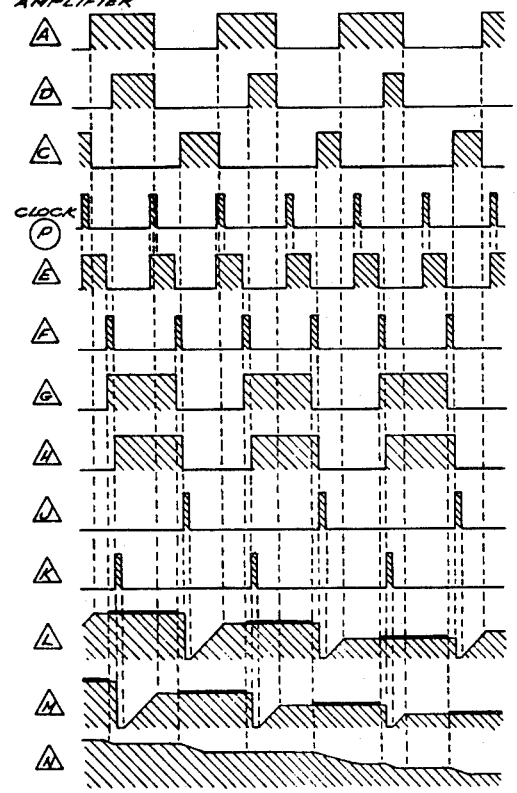

FIG. 17 is a diagram of the wave forms existing in different parts of the circuit of FIG. 16 except for the waveform B, shown by means of a triangle symbol, and these waveforms are designated by letters inside of a triangle on both FIG. 16 and FIG. 17.

Figure 18:
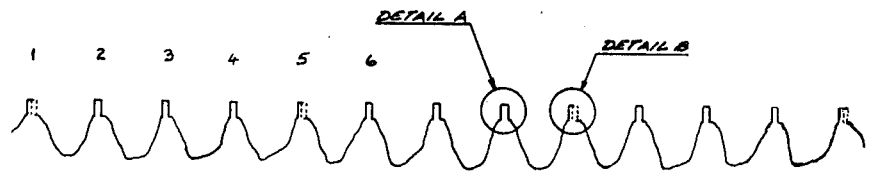

FIG. 18 is a diagram of the line start pulses of a video signal in which the trailing edge of every fourth line pulse signal is modified in accordance with the invention to carry audio signals and there is illustrated adjacent to the line of pulses an enlargement of one of them as detail A wherein there is no modification of the pulse and enlargement of another pulse as detail B showing by broken lines the length of pulse available for marking with suitable audio information and a modified form of detail B labelled detail B-1 shows the division of a pulse into two parts for double audio signal marking.

Figure 19:
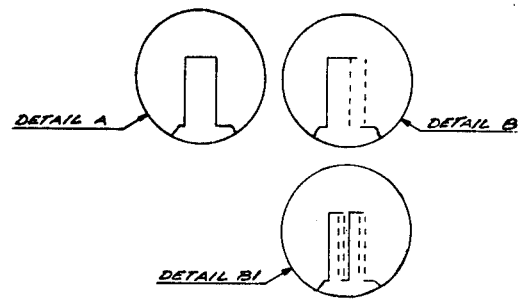
Figure 19:
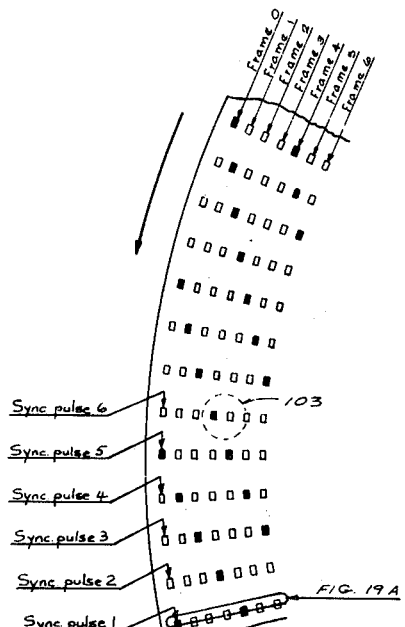

FIG. 19 is a diagram of a portion of a disc wherein the tracks of adjacent frames are separated for purposes of clarity and the line start pulses only are illustrated and the line pulses carrying audio information are marked as solid black rectangles to show the manner in which discrimination is made between one track and an adjacent track, even though the two tracks may be touching or overlapping.

FIG. 19-A is a diagram on a greatly expanded scale of the recorded pattern of the disc in the region around the trailing edges of the synchronizing pulses such as shown on FIG. 18, detail B.

FIG. 20 is a three-dimensional view of the working surface of a transducer provided especially in accordance with the invention having a capability of making a track that is razor edge in width and showing a body of non-magnetic material adhered to the transducer to increase the area of contact with a recording disc in order to reduce the pressure per unit of area.

FIG. 21 is a three-dimensional view of the mounting of the transducer of FIG. 20 wherein the transducer is upside down from FIG. 20 and the supporting mounting is made of flexible material to accommodate the various unavoidable motions of the transducer during operation.

FIG. 22 is a sectional view along the line 22—22 of FIG. 21.

Figure 23:
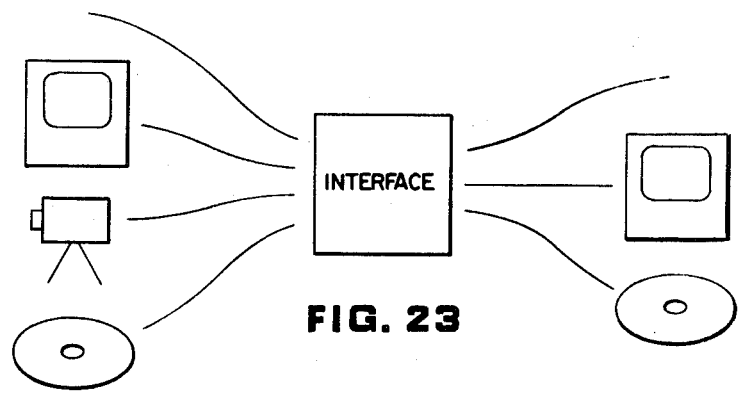

FIG. 23 is a diagram illustrating by a central box the mechanism of the invention and showing various types of input to the left of the box and various types of output to the right of the box.

Figure 24:
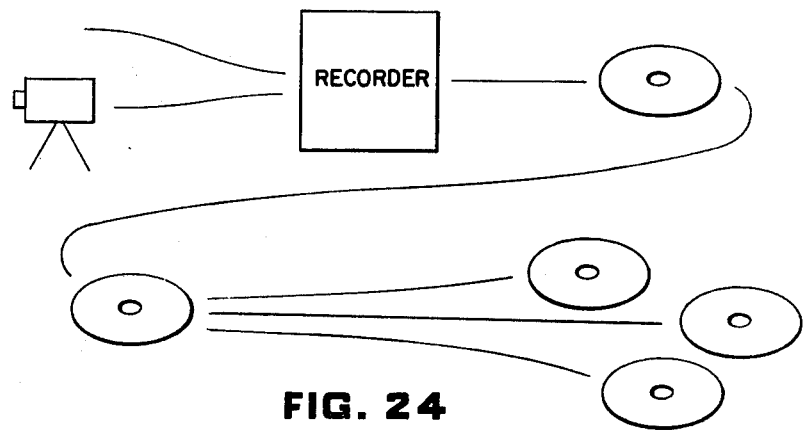

FIG. 24 is a diagram showing the apparatus of the invention as a central box and showing the invention as applied to a photographic disc illustrating that the mechanism can produce a photographic disc which can be taken outside of the mechanism for photographically making a number of copies of the disc produced by the mechanism.

Figure 25:
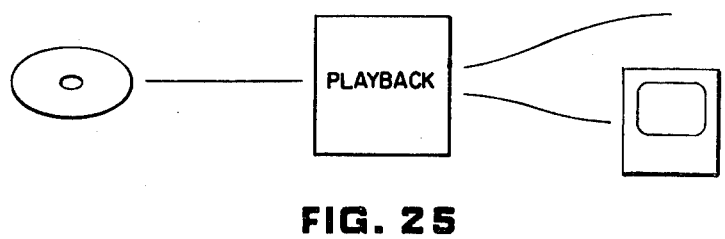

FIG. 25 is a diagram showing the use of the apparatus of the invention with a photographic disc wherein the output is a television display or a transmission line.

FIG. 1 depicts the disc 100, the inner limit of recording 101, the central hole 102 of the disc which fits on the spindle of the motor to be described later, the service, that is the recording or reading transducer 103, the stationary clock transducer 104, also to be described later, which reads a clock track 105. As the disc rotates the service transducer will be processing a succession of fields, leading and trailing, as it progresses radially, say toward the center. The rotation of the disc is shown by means of an arrow. A portion of FIG. 1, the detail A, is expanded on FIG. 2. Here the service transducer 103, is shown as processing the track for frame 0, 106, and at the instant that it reads the signals corresponding to element 0, 111. As the disc continues rotating this transducer will be reading in succession the signals corresponding to element 1, 112, then afterward the signals corresponding to element 2, 113, and so forth. In the next revolution of the disc, the transducer will have progressed radially inward to process the track for the next frame 1, 107, and in the succeeding revolution of the disc, it will be processing the track for frame 2, 108, and so forth.

FIG. 3 shows the standard television screen 120, also in a diagrammatic form. Here the screen is shown as having been analyzed into a fixed number of elements, each having a fixed position on the screen. Detail B is shown in an expanded form on FIG. 4. There, element 0, element 1, element 2, and so forth are shown as corresponding to the first line of scan in the usual sense of elements 0', 1', 2', and so forth as belonging to the second line of scan. The expected number of elements per line is about 200. This implies that the third line of scan would commence from element 200 and therefore the fourth line of scan would commence from element 200'. Here it should be pointed out that although the elements of the screen are ordered as it has just been described, the television interlacing standards require that the odd lines proper to the leading field are scanned first and the even lines proper to the trailing field are scanned subsequently. All these elements are produced simply by sampling the video signal at a uniform rate prior to the recording. This process is achieved by means of the encoder shown on FIG. 15, and it will be described later. Referring back to FIG. 2, each element is delineated by two heavy radial lines. In the case of magnetic discs, the area between these two lines will be a magnetization corresponding to a current in one direction in the recording transducer, say positive, and the intervening space between elements will correspond to the opposite magnetization, say negative.

In the case of photographic discs, the element areas will correspond either to a transparent area of the disc, and in this case we may call the disc a positive transparency, or the intervening areas will be transparent in which case the disc will be a negative transparency. Now, the distance between the limits of each element, that is the circumferential width of each element, will correspond to the amplitude of the original video signal.

Figure 2:
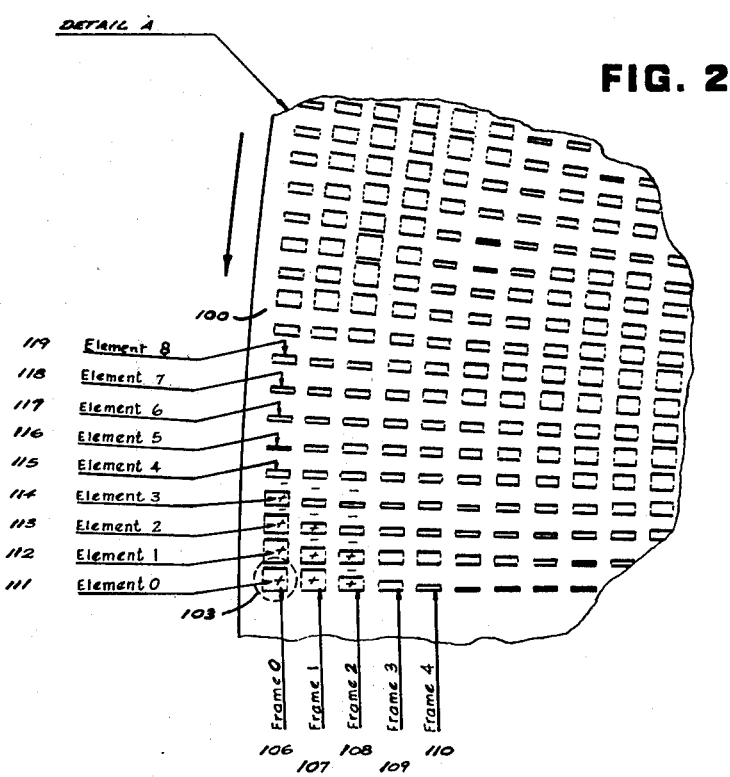
FIG. 2 is an enlargement of detail A of FIG. 1 showing a modified form of the invention wherein elements are recorded in tracks that are discrete and the tracks are not touching.

FIG. 2 indicates, for reasons of clarity, a certain distance between tracks, and shows the tracks as they would have been recorded if no overlap had occurred. On FIG. 5, the tracks are shown as having been recorded with a certain percentage of overlap which has made all tracks contiguous. In the case of magnetic recording this is easily achieved because the process of recording automatically erases the previous information directly under the transducer, and the overlap will not affect the quality of the tracks at the point of overlapping. However, more care should be taken in the case of photographic discs. There it may be necessary to reduce the width of each track proportionally to the amount of the intended overlap. FIG. 5 also shows the clock track 105, containing permanently recorded and uniformly spaced timing signals which the clock transducer 104 reads and accordingly processes by sampling the video signals to be recorded, thus forming automatically the picture elements as described above. More specifically, during recording at each clock mark the television signal is sampled and according to its amplitude a picture element of proportional circumferential width is recorded on the disc at the appropriate location and track, hence the term Pulse Length Coding. It will be noted further that the leading boundary of these picture elements corresponds exactly with the clock mark, and that the trailing edge is a measure of the television signal amplitude recorded at that instant. Since the leading boundaries of the elements correspond exactly with the clock marks which are permanently recorded, they can be omitted as redundant, because they can always be reinstated by deriving them from the clock track. This arrangement will result in an improvement in storage efficiency by a factor of two. The signals recorded by this method are depicted in FIG. 6. There it may be noted that overlapping is also possible and that once again the elements merge into a radial pattern. If a recording transducer capable of producing very narrow tracks is used, and if its radial progress is slow as expected, then the elements merge into a smooth radial pattern, as shown in FIG. 7.

On the other hand, it has been proved much easier to playback discs on which both boundaries have been preserved, because the information carried by the clock track is not needed and thus the unavoidable minute displacements of the clock track transitions in relation to the transitions in the main disc surface due either to the flange diameter tolerances when replacing the disc, or to replicating distortions, are ignored. Thus, machines that are required to read only can be even simpler because the clock track transducer can be eliminated. As indicated in FIG. 5, the clock information is present at the leading edge transitions of the respective individual elements so that the clock track 105 may be dispensed with.

An additional advantage of retaining the leading edges is the fact that they can also carry information which is also varying smoothly in the time (or orthogonal) direction. Naturally, it cannot be sound information since sound does not have this property, but it can very well be color information. In fact, the information for color not only has similar statistical interrelations between successive frames but also requires considerably lower bandwidth than the information for luminance.

For the case of recordings in color the preferred approach is to first modulate or encode the leading edge transitions to contain the color chrominance (or color difference) information and then encode the luminance information in the trailing edge transitions as described above but now relative to the positions of the encoded leading edges instead of the original clocks. This would permit the direct decoding of the luminance information from the recorded information without the use of a clock track. Such an arrangement is shown in FIG. 5A. (An alternative approach would be to encode the luminance information in the trailing edge transitions relative to the clock track in which case the clock track would be required in the decoding of the luminance information). All or part of the leading edge transitions can be used to carry the chrominance information. In the case where information is encoded on all leading edges it is the position of these edges relative to the clock track transitions which contains the information. Such a modulation technique is shown in the left-hand portion of FIG. 5A (Frames 0, 1, 2, 3, 4 . . . ) wherein the leading edge transition of each element (Elements 0–8, etc.) is varied in position relative to the clock track transition as indicated by the broken line in each element. This, however, requires the use of the clock track, or a reinstated clock signal, during playback.

Advantage can be taken of the low bandwidth requirements of the chrominance signal by using only a portion of the leading edge transitions to encode these signals, the remainder serving to provide a clock reference to be used both in recording and playback, thus making it possible to do without the clock track during playback. An example of such a modulation technique is shown in the right-hand portion of FIG. 5A (Frames $N_1$, $N_2$, $N_3$) in which the clock information is represented by the leading edge transition in each even element (Elements 0, 2, 4, etc.) and the chrominance information is represented by the leading edge transition in each odd element (Elements 1, 3, 5, etc.). Thus, one-half of the leading edge transitions (every other transition) is left uncoded (that is, its position is determined directly from the clock track during recording) and the alternate leading edge transitions are then encoded by varying their position relative to the preceding unencoded one. In the NTSC system (used for commercial television in the United States) two color difference signals of low bandwidth are required which can be easily accommodated by using alternate pairs of the leading edge transitions for each signal. In the right-hand portion of FIG. 5A, the leading edge transitions of Element pairs 0–1, 4–5, 8–9, etc. contain information for one color difference signal while the other color difference signal information is represented in the remaining Element pairs. In the case of SECAM (the system used commercially in France) the two color difference signals may be encoded in a similar manner but during alternate scan lines of the television frame.

In any of the above situations, where the original clock information is missing from the recorded signal it is possible to reinstate the clock by phase-lock loop techniques or by including a reference burst in the area of the horizontal sync signal, but at the cost of increased complexity.

FIG. 8 shows the central hole of a rigid magnetic or photographic disc shaped in such a way that the protrusions 144 and 145 still form the originally circular hole periphery, with the recessed portions 146 and 147 intervening. This arrangement permits the disc to be introduced on the spindle 148, as shown on FIGS. 9 and 10. There, the protrusions 144 and 145 will contact firmly the spindle because of the radial force exerted by the spring 149, which is anchored on the disc by some suitable means such as the pins 150. Note that the result of this combination is to achieve the effect of a disc having a tightly fitting central hole without the difficulty of accurate manufacture and without the difficulty of fitting and removing such a tightly fitting disc. These two protrusions can be considered as two points of contact, as they can be made as narrow as desired, and as it is generally known in geometry they define uniquely the position of a circle of constant diameter. Of course, it is required that the cylindrical surface 151 of the motor spindle 148 be very accurately concentric with the effective rotational axis of the motor 153. One means of achieving this would be to perform the final machining of the surface 151 using the motor itself as a lathe with the spindle attached finally to the motor shaft. The accuracy, in this manner, will depend on the precision of the motor bearings, which customarily are manufactured with very high concentricity. The disc can be clamped on the flat surface 152 of the spindle by means of a disc clamp described in a copending patent application by George E. Zenzefilis, Ser. No. 816,874 filed Mar. 19, 1969, now U.S. Pat. No. 3,609,722 and depicted there in FIGS. 9 and 10. An alternative method of achieving the same effect when flexible discs are involved would be a rigid insert as shown on FIG. 11. There, since the insert is constructed as a separate unit from the disc, the insert can incorporate the spring either as a machined portion of it or an additional piece. The mounting of a separate spring is shown in FIG. 12.

FIG. 13 depicts a possible method of mounting a thin and hence flexible disc, either magnetic or photographic, on an insert which incorporates an integral spring 180.

FIG. 15 shows the preferred encoder which analyzes the video signal into the picture elements, encodes it in the PLC mode, and also adjusts the number of the picture elements according to the degree of recording resolution desired. There, the video input signal is compared with a locally generated periodic ramp (i.e. ascending at a constant rate) voltage function, waveform E, in the comparator, $OA_1$. The output of the comparator is digital in nature: it has a fixed positive voltage value whenever the ramp amplitude is less than the video signal amplitude, and it has the ground potential when the ramp amplitude is greater than the video signal amplitude. Each negative going transition of the comparator output causes the outputs of the flip-flop, $FF_1$, to change states. These negative transitions, therefore, occur at the instant when the ramp amplitude exceeds the video signal amplitude. The ramp is generated by charging capacitor $C_3$ from a constant current source such as the circuitry of transistor $Q_2$ operating as an emitter follower, and being driven by the driver transistor $Q_1$ and their associated resistors. The rate of charging, or the slope of the ramp, is determined by the setting of $R_7$. The ramp is initiated by the clock input, waveform A, which triggers the pulse shaping multivibrator $PMV_1$, whose period, waveform B determines the duration of the ramp. At the termination of the period of $PMV_1$, $Q_3$ is turned on by the complementary output of the multivibrator, waveform C, discharging the capacitor $C_3$ to ground, thereby resetting the ramp generator. The resulting ramp function is shown by waveform E.

FIG. 16 shows the preferred decoder schematic. In the playback action the decoder converts the signals read from the disc into an analog video waveform suitable for presentation directly to a standard television monitor or to a radio frequency modulator which modifies the signals suitably to operate a common television receiver by means of a direct connection to the latter's aerial terminals.

As the information read from the disc does not contain clock information, it is necessary to reinstate this information to obtain the proper video output waveform. The required clock information which is derived from the permanently recorded clock track is provided as a second input to the decoder.

As discussed previously for the case of the encoder, a ramp signal was initiated at every clock transition and whenever the ramp signal crossed the input video signal a transition was recorded on the disc. Now, in the decoder, a ramp signal is initiated at every clock transition and its amplitude value at the next transition appearing at the reading transducer terminals and suitably amplified by the read amplifier, is transferred to the output in the form of a voltage level segment. This is implemented by a two branch circuit to achieve better quality with less filtering, than normally required, to reduce switching or sampling noise.

Because there may be slight errors in the relative angular positions of the service and clock transducers a variable delay is provided for the clock signals by $DMV_1$ and $PMV_1$ and their associated timing components. $DMV_1$, which is triggered by the leading edges of the input clock signal, waveform of FIG. 17, has an adjustable period to provide the above mentioned delay. $PMV_1$ is triggered by the trailing edges of $DMV_1$ output pulses, E, and provides clock pulses of fixed width, F, corresponding to the input clock, P, delayed by the period of $DMV_1$. The clock inputs of the flip-flops $FF_1$ and $FF_2$ are fed by the complementary outputs of $PMV_1$ such that $FF_1$ is triggered on the leading edges and $FF_2$ on the trailing edges of the $PMV_1$ output pulses. The $FF_1$ and $FF_2$ outputs are square waves, G and H respectively, with H being delayed from G by the width of the $PMV_1$ output pulses. For $FF_1$ the J and K inputs are as shown by waveform A and its complement B by waveform B in order to provide means for proper synchronization of G and H with the signals read from the disc. The signal waveform read from the disc is applied to the switching transistor $Q_1$ via a bias network, $R_4$, $R_5$, and $R_6$, to allow for symmetry adjustments. The waveform A (Collector of $Q_1$) now corresponds to the output of the encoder when the recording was made. Waveform B (collector of $Q_2$) is simply the complement of A. Waveform A is applied to $Q_3$ causing it to be turned on (saturated) whenever A is high, holding C at ground. Waveform H is applied to $Q_4$ causing it to be turned on whenever H is high, holding C at ground. Thus the resultant waveform at C is at ground whenever A or H is high, and high whenever A and H are both at ground. Similarly waveform D is at ground whenever B (complement of A) or the complement of H ($FF_2$ $\bar{Q}$) is high, and high whenever B and the complement of H are both at ground. Waveform C is coupled by capacitor $C_6$ into $Q_5$ causing $Q_5$ and $Q_6$ to be turned on whenever C is high. $Q_5$ and $Q_6$ and their associated resistors make up a constant current source which charges capacitor $C_7$, generating a ramp whose ending potential is proportional to the time between the starting of the ramp (the trailing edge of H) and the next transition of the input from the read amplifier. When C returns to ground level $Q_5$ and $Q_6$ are turned off and the charge on $C_7$ is held constant until it is discharged by $Q_7$. The discharge of $C_7$ takes place on the leading edge of C, which is differentiated by $R_{15}$, $L_1$, and $CR_4$ to give a narrow pulse (waveform J) at the base of $Q_7$, which turns it on discharging $C_7$. It will be noted that $Q_5$ and $Q_6$ are turned on by C, the same signal whose leading edge causes $Q_7$ to discharge $C_7$. Thus, the ramp across $C_7$ does not start at the instant that the constant current source is turned on but after the discharge is completed and $Q_7$ is turned off. The resulting waveform is shown at L. In a similar manner, in the lower branch, a ramp function based on waveform D is generated. The resulting waveform is shown at M. The ramp amplitudes in L are determined by the locations of the positive-going transitions of A relative to the clock and in M by the locations of the negative-going transitions of A. Consequently waveforms L and M each decode alternate transitions of waveform A, so that while the ramp of L is being generated, the amplitude of M is held constant, and vice versa. During the time when each waveform is being held constant, their amplitudes are transferred into the output complementary emitter follower stage composed of $Q_9$ and $Q_{16}$. L is coupled by $Q_8$ whenever G is high and M is coupled by $Q_{13}$ whenever G is low. On waveforms L and M the thickened portions show the periods when they are coupled to the output, and waveform N is the resultant output.

The amplitude of the audio signal is itself sampled at equally spaced intervals and applied by means of another PLC to the synchronizing signals of the video before the latter is processed by the encoder. Thus the leading edge of a synchronizing pulse is fixed in its original position on the video signal sequence, but its trailing edge, and therefore its duration is a measure of the audio signal amplitude at the sampling instant. The standard synchronizing signals being in the form of pulses 5.08 μs wide with an additional 3.81 μs trailing unused interval, the preferred place to introduce this additional modulation is in the trailing edge of the synchronizing pulse. It should be pointed out that only the leading edge of the synchronizing pulses is needed for synchronization. The total width of 5.08 μs+3.81 μs is needed only to ensure uniform blanking during the retrace of scanning which is initiated by the leading edge, and hence it ensures a straight left edge on the television receiver's screen. Since these widths are known, the complete pulse can be reconstituted by ordinary circuitry. The resulting waveform, consisting of combined audio and video signals is treated as an ordinary video waveform, that is analyzed, sampled, and recorded on the disc in the manner already described. Now, due to the overlapping of the tracks, and also because of some unavoidable eccentricity of the disc during playback, the reading transducer may well wander over portions of tracks other than the proper one, and also may be reading portions of more than one track at one time. As discussed in the abstract, this can give some picture distortion. However, because of the statistical time interdependence between picture elements of successive frames, the effect of this picture distortion is small. An audio signal, though, has no such statistical time interdependence, and a reconstituted audio signal from a reading transducer which passes over more than one track will suffer objectionable distortion, because it will contain simultaneous signals which should be separated in time. For this reason, only every fourth (or other suitable number) synchronizing pulse is modulated by PLC. FIG. 18 shows the combined video and audio waveform with every fourth synchronizing pulse modulated in the manner described.

Detail A shows in enlarged form an unmodulated synchronizing pulse and detail B shows a modulated pulse, where the pulse duration, and thus, the position of the trailing edge, can be anywhere between the limits shown, determined by the audio signal amplitude at the sampling instant corresponding to a particular synchronizing pulse. FIG. 19 shows in diagrammatic form the synchronizing signal portion of the recorded picture information on the disc, in which the sound carrying pulses are shown black. Since in this case every fourth synchronizing pulse is chosen, the modulated pulses in adjacent tracks (shown separated in this diagram for clarity) are displaced relative to one another in the manner shown.

During playback the reproduced signal, signal, after decoding, can be processed to yield the audio signal from the correct pulses in the proper order. Since there are 525 synchronizing pulses per frame and since only one quarter of these, or 131, will contain sound information, and since the disc rotates at 30 revolutions per second, it follows that the sound is contained in samples occurring at 3930 per second. According to the well known Sampling Theorem, the highest frequency that can be reproduced by this rate is one half the rate, or 1965 cycles per second. For higher audio signal quality, the sound signal can be sampled at a higher rate, say 7,860 times per second, and the measures resulting from every two consecutive samples placed at the trailing region of the next occurring synchronizing pulses. This is so, because unlike the previous case one-to-one correspondence cannot be used since the rate of synchronizing pulses is unchanged. It can be recognized by those who are skilled in the art that such a process, known as time compression is quite possible. For example, both sound samples can enter as they occur a two place register which is emptied rapidly at the proper time when the synchronizing pulse occurs. Detail $B_1$ shows a possible encoding process which introduces an additional and auxiliary pulse in the region of the synchronizing pulse. During playback the inverse process will be used, known as time expansion, which will reproduce a sequence of samples of the original rate and hence a sound of better fidelity.

Figure 19A:
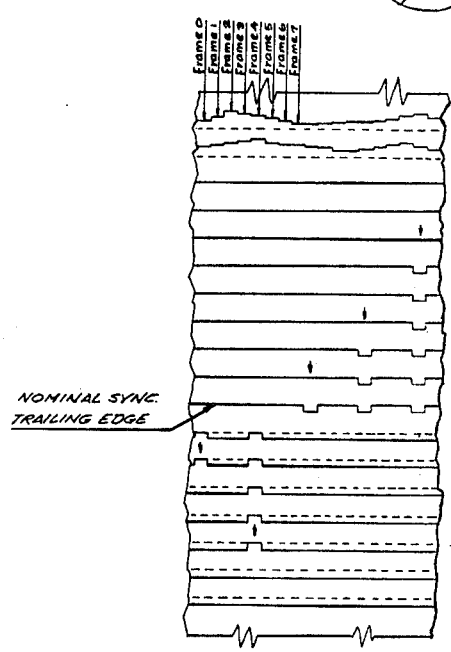

FIG. 19A is a diagram, in greatly expanded scale, of the recorded pattern on the disc in the region around the trailing edges of the synchronizing pulse, such as shown on FIG. 18 detail B, for one scan line, with the tracks shown as recorded contiguously to one another. Because in this example only every fourth synchronizing pulse is modulated and because of the scale and also because of the precession previously described, every fourth track is shown with a modulated synchronizing pulse. In this picture in the video portion of the recorded pattern, the black level corresponds with the clock transitions and according to the United States system it corresponds with the so called front and back porch of the synchronizing signal, that is the preceding of following region during which the television screen is blanked. The synchronizing pulse itself is at a level that would be "blacker than black," and is consequently represented by a transition in advance of its clock transition. Because of the fact that PLC is used the sound measure will be indicated by the occurrence of the back porch, that is a large sound intensity will have stretched the duration of the synchronizing pulse forward and vice versa. Thus, on FIG. 19A the first indicated track Frame O contains, as indicated by the arrow, a sound level of somewhat low intensity, as compared with the nominal trailing edge of the synchronizing pulse; the fourth track Frame 3 contains a sound level of still lower intensity, the eighth track Frame 7 contains a sound level of higher intensity than the average (the latter would correspond with the nominal synchronizing pulse trailing edge), and so forth. Here it should be pointed out that, with the system of varying the speed of traverse of the transducer according to the movement content of the pictures, a lower limit to the speed of traverse is set by the need to preserve the sound signal. If the trucks are merged too heavily the modulated synchronizing pulses will be lost.

FIG. 20 shows the transducer with the working face, that is, the face which is in contact with the disc, uppermost. The ferrite core with its narrow glass bonded or otherwise gap, with its winding and generally its structure, is shown as customarily these transducers are currently constructed. However, the pole pieces 302 and 303 are surrounded by a combination of half pill shaped pieces 300 and 301 which as a group have the effect of presenting a circular face to the disc. The purpose of such an arrangement is fourfold:

(1) The contact area of the head is large enough to permit small contact pressures in order to reduce wear, without unnecessarily increasing the magnetic area of the transducer per se. This is so because the pill shaped pieces 300 and 301 are made of a material having identical properties, that is hardness, elastic modulus, temperature coefficient of expansion, tensile strength, as the magnetically permeable pole pieces 302 and 303. However, the pieces 300 and 301 are non-magnetic.

(2) The circular surface of contact offers the facility of having a substantial restoring moment of forces in any orientation: for example, if the transducer is tilted for any reason so that only its edge 304 is in contact with the disc, the restoring moment tending to reinstate full contact is equal, always, to the product of the vertical force supplied by the transducer holder and the radius of the circular surface. This restoring moment is very important not only when the transducer is processing the disc while it moves gradually in a radial direction, but even more so when the transducer is moving rapidly. So when moving rapidly in order to cover other regions of the disc in rapid succession, the transducer does not dig into the surface of the medium. Such motion of the transducer could be effected by a suitable mechanism such as that in U.S. Pat. No. 3,474,687 by George E. Zenzefilis. Even though the above referred patent covers disc recorded with digital information, the same mechanism can be used to rapidly advance the described transducer for television applications, as described in this disclosure.

(3) It is possible to reduce the width of the pole pieces 302 and 303 in the region of the gap, as shown in FIG. 20, by machining, or chipping, or other suitable means, and thus achieve very narrow tracks, without affecting the mechanical performance of the transducer, or its effective area of contact.

(4) It should be noted from FIG. 20 that the pill-shaped pieces at the region of attachment with the ferrite core 307 and 308 form grooves 305 and 306 respectively. The purpose of these grooves is to preclude the bonding material, such as epoxy adhesive, to come in contact with the disc. Such a contact would be undesirable because the commonly used bonding materials are soft and thus they can collect particles of dust and other abrasive material which tend to score the disc or otherwise damage it.

(5) Typical dimensions that have proved useful are gap widths of 0.0001 inch to 0.001 inch formed by narrowing down a magnetic structure width of about 0.025 inch. The body diameter may be 0.1 inch and body height 0.03 to 0.06 inches.

It should be noted that the contours 304 of the surface of contact are sharp in order to preclude the introduction of dust particles between the surfaces 300, 301, 302, and 303. Therefore if the surface of the disc does contain dust particles, they are simply pushed out of the way as the disc rotates or as the transducer travels. FIG. 21 shows the preferred transducer holder, attaching the transducer to the drive mechanism. It will be noted that arms 350 and 351 being long and flexible provide a vertical force of the desired magnitude and at the same time provide negligible resistance to the transducer's translatory motion up and down, negligible resistance to the transducer's rotationary motion in the rolling axis, negligible resistance to the transducer's rotationary motion in the pitching axis, however, it does preclude rotationary motion in the yawing axis and translationary motion in the other two remaining directions namely left and right and forwards and backwards. It should be also noted that the shape of the transducer permits a equal distribution of masses above and below the holder in order to eliminate tilting during acceleration. Such a holder can be very conveniently constructed by etching a thin sheet of suitable metal, 352.

FIG. 23 shows in a diagrammatic form the usages of this invention as a recorder and reproducer of magnetic discs. On the left I show the various inputs namely, (1) an input line carrying the video information say from one of the following (2) a television receiver (3) a camera (4) a disc recorded obviously elsewhere. On the right are shown the possible outputs, one, an output can possibly be another line which could transmit the information recorded by any of the four input means as just described, to any other similar system or say to a telephone line and so forth. In the case where the information is received or transmitted by means of telephone lines it should be mentioned that another feature of such a recording means is the ability to change the rate of transmission. For example the disc can be slowed down sufficiently during reception or transmission of video signals since rate capability of telephone lines is much slower than the capability of discs.

FIG. 24 shows a similar system using photographic discs. Since the latter can only be exposed once the system depicted in this figure acts as a recorder only. There is shown, diagrammatically how the first recorded disc is used as a master for wide replication.

FIG. 25 shows the system as used with photographic discs in the reproduction mode. There, one of the replicated discs as described above is introduced and the outputs can be displayed in a standard television receiver or just available in a transmission line. It should be noted that in this configuration the system cannot produce additional discs.

What is claimed is:

1. A device having video information stored thereon for reproduction by means of an associated transducer during relative movement between the transducer and the device comprising:

a plurality of discrete information storage segments located over the surface of said device, each segment representing the condition of a corresponding element of a video display device associated with said transducer for reproducing the stored information in a succession of video frames, each frame being formed of scan lines;

said discrete segments being arrayed for traversal during movement of the transducer relative to the device along a succession of generally circumferential paths while the transducer progresses in a direction of relative movement substantially orthogonal to the circumferential path direction, each circumferential path of discrete segments representing a video frame; and said discrete segments being arrayed in a plurality of rows generally aligned orthogonally to the direction of the circumferential paths wherein the discrete segments from path to path corresponding to a particularly display device element are located at generally the same angular position from the center of rotation with respect to a reference position.

2. A device in accordance with claim 1 wherein said device is a disc adapted for rotation in the plane of the disc adjacent said transducer.

3. A device in accordance with claim 2 further including means for mounting the disc for rotation about a spindle.

4. A device in accordance with claim 2 wherein the respective rows are radially directed relative to the center of rotation of the device.

5. A device in accordance with claim 2 wherein the disc includes remanently magnetic material as the storage medium.

6. A device in accordance with claim 2 wherein the disc includes exposed photographic material as the storage medium.

7. A device in accordance with claim 3 wherein said disc mounting means comprise:

a hub formed on the disc having a circular opening for the spindle that is relieved at all places except two that are less than 180° spacing; and a spring biased shoe on the hub opposite the two contact points to hold the two points in contact with the spindle.

8. A device as set forth in claim 7 wherein the shoe is a resilient peripheral finger that yieldingly contacts the spindle.

9. A device in accordance with claim 1 wherein each information storage segment has boundaries at its leading edge and trailing edge, respectively, relative to the direction of relative motion between the transducer and the device, at least one of which boundaries is varied in position in accordance with the information represented by said segment.

10. A device in accordance with claim 9 wherein the leading edge and trailing edge boundaries for a given storage segment together represent color video information of the corresponding element of the associated display device.

11. A device in accordance with claim 10 wherein one of said boundaries represents the luminance condition of said corresponding display device element and the other boundary represents chrominance information of said corresponding display device element.

12. A device in accordance with claim 10 wherein the leading edge boundary of said storage segment represents chrominance information and the trailing edge boundary represents the luminance condition of said corresponding display device element.

13. A device in accordance with claim 10 wherein the leading edges of a series of storage segments along a given path represent both clock information and chrominance information for said corresponding display device elements.

14. A device in accordance with claim 13 wherein certain storage segment leading edges represent clock information and other storage segment leading edge represent chrominance information.

15. A device in accordance with claim 14 wherein the leading edges of alternate storage segments in sequence represent respectively clock information and chrominance information.

16. A device in accordance with claim 1 wherein adjacent information storage segments along a given path are separated by distinct boundaries, said boundaries being varied in position in accordance with the information represented by the corresponding adjacent storage segments.

17. The method of recording color video signals on a storage medium wherein the video picture is formed of frames and each frame is formed of lines comprising:
(a) breaking each line into a selected number of elements at distinct intervals along the line; and
(b) recording in generally coaxial paths on the storage medium one discrete imprint for each element in each line, the storage characteristic of each imprint corresponding to the information characteristic of the corresponding element being recorded, such that the imprints from frame to frame of corresponding elements are located at generally the same angular position from the center of rotation with respect to a reference position, each imprint being terminated by first and second boundaries between adjacent imprints along a given coaxial path;

said step of recording a given imprint comprising the steps of:
(1) varying the position of one of said boundaries to represent luminance information of said corresponding element; and
(2) varying the position of the other of said boundaries to represent chrominance information of said corresponding element.

18. A system for recording color video signals on a storage medium wherein the video picture is formed of frames and each frame is formed of lines comprising:
(a) means for sampling the video at a selected number of elements at distinct intervals along the line; and
(b) means coupled to the sampling means for recording in generally coaxial paths on the storage medium one discrete imprint for each element in each line, the storage characteristic of each imprint corresponding to the information characteristic of the corresponding element being recorded, such that the imprints from frame to frame of corresponding elements are located at generally the same angular position from the center of rotation relative to a reference position, each imprint being terminated by first and second boundaries between adjacent imprints along a given coaxial path;
(c) said recording means including means for varying the position of one of said boundaries in accordance with luminance information of said corresponding element and means for varying the position of the other of said boundaries in accordance with chrominance information of said corresponding element.

* * * * *